Figure 4:
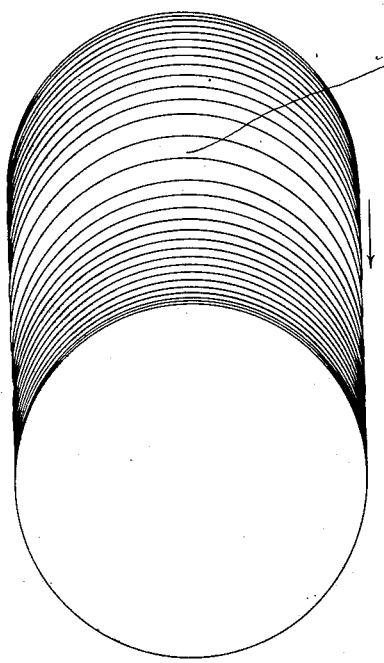

No. 812,485.　　　　　　　　　　　　　　　　PATENTED FEB. 13, 1906.
H. A. DAVIS.
PICKING MECHANISM FOR LOOMS.
APPLICATION FILED JULY 31, 1905.
2 SHEETS—SHEET 1.
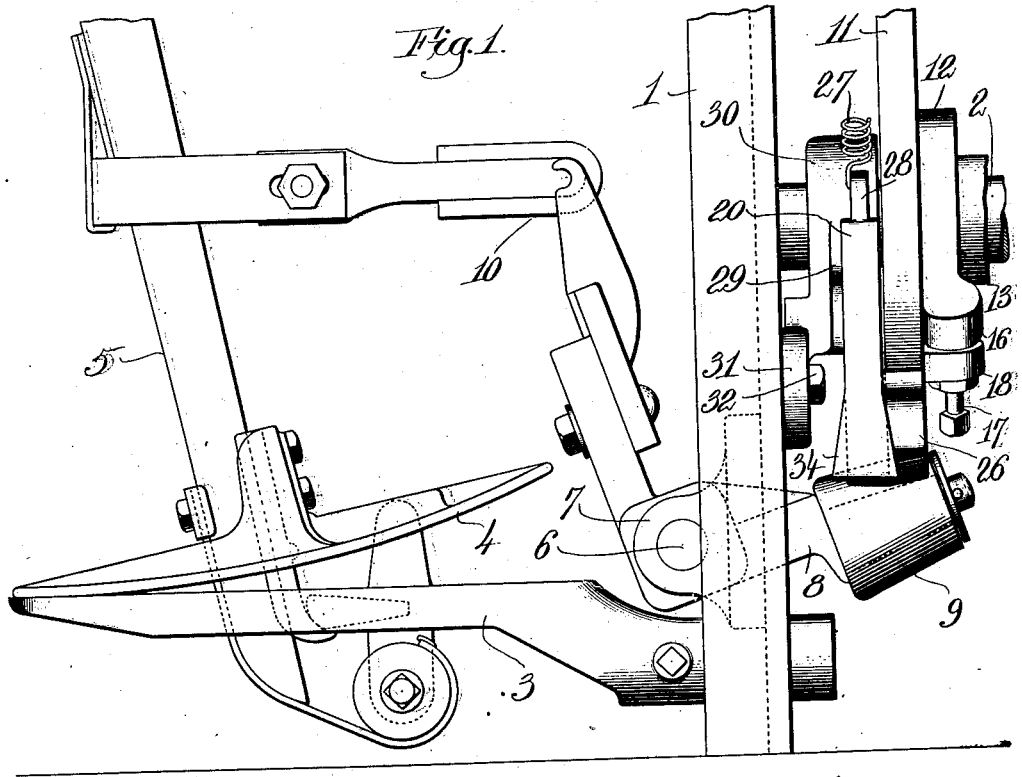
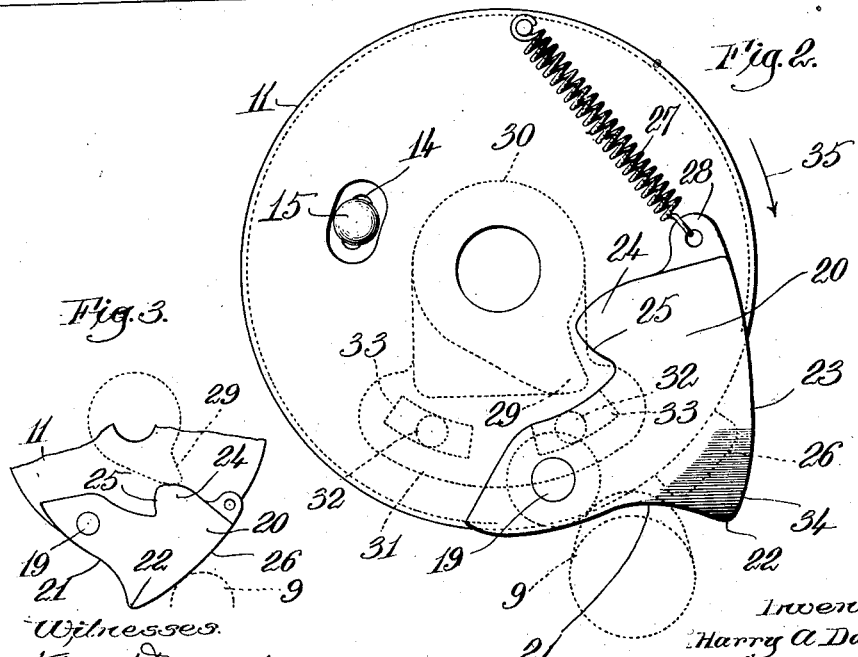
Witnesses.
Thomas Drummond
Edward H. Allen
Inventor.
Harry A. Davis,
by Crosby Gregory
Attys.

No. 812,485.

PATENTED FEB. 13, 1906.

H. A. DAVIS.
PICKING MECHANISM FOR LOOMS.
APPLICATION FILED JULY 31, 1905.

2 SHEETS—SHEET 2.

Usual Pick Motion.
Acceleration rapidly increases for 50% of stroke of roll.

Present Pick Motion.
Acceleration gradually increases and extends for 80% of stroke of roll.

Witnesses.
Thomas J. Drummond
Edward H. Allen.

Inventor.
Harry A. Davis,
by Crosby Gregory
Attys.

UNITED STATES PATENT OFFICE.

HARRY A. DAVIS, OF HOPEDALE, MASSACHUSETTS, ASSIGNOR TO DRAPER COMPANY, OF HOPEDALE, MASSACHUSETTS, A CORPORATION OF MAINE.

PICKING MECHANISM FOR LOOMS.

No. 812,485.   Specification of Letters Patent.   Patented Feb. 13, 1906.

Application filed July 31, 1905. Serial No. 271,875.

*To all whom it may concern:*

Be it known that I, HARRY A. DAVIS, a citizen of the United States, and a resident of Hopedale, county of Worcester, and State of Massachusetts, have invented an Improvement in Picking Mechanism for Looms, of which the following description, in connection with the accompanying drawings, is a specification, like numerals on the drawings representing like parts.

This invention relates to the picking mechanism of looms whereby the shuttle is thrown or picked back and forth through the shed; and it has for its object the production of novel and effective means for imparting a more gradual and extended acceleration to the movement of the picker on the active stroke, while decreasing the power required to operate the shuttle.

In ordinary picking mechanism the revolving picking-cam has its impact-face so shaped as to give the picker a very rapid but short acceleration on its active stroke, practically only about fifty per cent. thereof. When dealing with broad looms where the shuttle travel is long, it is practically impossible to secure the desired acceleration of the shuttle while in contact with the picker, because if the impact face or surface of the picking-cam be shaped to make the acceleration more gradual it is so concave or hollow that a hooking action results as the cam is coöperating with the usual roll during the latter part of such coöperation. Manifestly any attempt to increase the acceleration and useful work of the picker by such means would be highly objectionable, as the wear would be vastly increased and the additional jar and shock would be most injurious to the various parts of the mechanism. In accordance with my present invention I have provided means whereby the desired gradual acceleration of movement of the picker on its active stroke is effected and through the major portion of such stroke, (in actual practice about eighty per cent. thereof,) the results being secured without any increase in the shock or jar of the operating parts and with a decreased expenditure of power. This is accomplished in the present embodiment of my invention by a peculiar movement imparted to the picking-cam when it coöperates with the roll, such movement being compounded of a bodily-revolving motion of the cam about a fixed axis and an outward or substantially radial movement of the roll-engaging portion of the cam with reference to its axis of revolution.

The various novel features of my invention will be fully described in the subjoined specification and particularly pointed out in the following claims.

Figure 5:
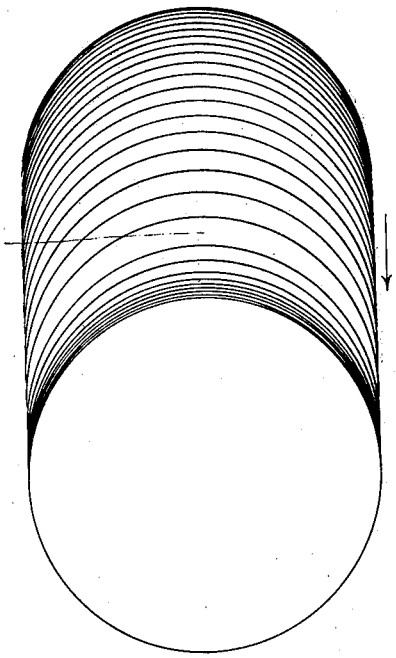

Figure 1 is a front elevation of a loom picking mechanism embodying one form of my invention, it being understood that the picking mechanism is duplicated at each side of the loom. Fig. 2 is an outer side elevation of the picking-cam and the revolving carrier on which it is mounted as it would be seen when looking toward the right, Fig. 1, the means for effecting radial movement of the cam being shown in dotted lines and just at the instant such movement is to be effected. Fig. 3 is a detail showing the picking-cam in its extreme outward position, the throw of the roll having been completed. Fig. 4 is a diagrammatic view showing the movement of the pick-roll per degree of revolution of the cam-shaft in the ordinary pick motion, and Fig. 5 is a similar view showing the movement of the pick-roll in accordance with my present invention.

Referring to Fig. 1, the loom side 1, rotating cam-shaft 2, the oscillating stand 3, connected in practice with the lay rocker-shaft, (not shown,) the shoe 4, mounted to rock on the stand in the direction of its length, the attached picker-stick 5, the picking-shaft 6, mounted to rock in bearings 7 on the loom side and provided with an arm 8, carrying the usual conical bowl or roll 9, and the connection 10 between the picking-shaft and the picker-stick 5 may be and are all substantially of well-known construction and operate in usual manner. In the present embodiment of my invention I mount the picking-cam on a circular or disk-like carrier 11, fixedly connected to the shaft 2 by means of a coupling 12, Fig. 1, having a hub 13 secured to the shaft, the carrier having a segmental slot 14, Fig. 2, to receive a clamping-bolt 15, which enters the coupling 12 at one side of the shaft 2. The opposite end 16 of the coupling (see Fig. 1) bears against a set-screw 17, mounted in a lug 18 on the adjacent face of the carrier, so that by loosening the clamping-bolt 15 and turning the set-screw 17 the carrier can be adjusted angularly on the shaft 2.

The coupling itself is not of my invention and is at present in common use to secure the picking-cam on its shaft and to provide for angular adjustment of the cam.

Near its periphery the outer face of the carrier is provided with a lateral stud 19, on which is pivotally mounted the picking-cam 20, said cam in general shape being substantially triangular and having an easily-curved roll-engaging portion 21 (see Fig. 2) extended beyond the periphery of the carrier. A projection or lug 26 on the cam is normally held against the periphery of the carrier by a spring 27, fixed at one end to the carrier and at its other end fastened to an ear 28, forming one of the corners of the cam, and, referring to Fig. 2, it will be seen that bodily revolution of the cam about the axis of the shaft 2 would of itself cause comparatively slight movement of the roll, as the engaging portion 21 is of a very gradual rise to the high point 22.

In order to increase the effectiveness of the picker on its active stroke, I have provided means to impart thereto a gradual and greatly-extended acceleration of movement, and to this end the cam is given a quick outward movement in a generally radial direction, while the cam-face 21 is in engagement with the roll 9, the inner side of the cam 20 being provided with a toe 24, having a convexed impact-face 25, which is practically radial when the stop 26 is in engagement with the periphery of the carrier. This face is engaged by a tripping device, shown as a strong and heavy cam or lug 29, formed on the hub-like portion 30 of a bracket 31. (See full lines, Fig. 1, and dotted lines, Fig. 2.) The cam-shaft 2 passes loosely through the hub 30, and the bracket 31 is bolted to the inner face of the loom-side by suitable bolts 32. Referring to Fig. 1, it will be seen that the hub is offset from the bracket, so that the picking-cam will clear the latter, the lug or cam 29 projecting into the path of movement of the toe 24, as clearly shown in Fig. 2. The bolts 32 are extended through segmental slots 33 in the bracket, (see Fig. 2,) so that the trip 29 can be set to meet the toe 23 of the picking-cam earlier or later in the bodily revolution thereof.

As shown in Fig. 1, the outer corner of the cam 20 is thickened, as at 34, as the greatest strain comes upon that part of the cam adjacent its high point 22.

Referring to Fig. 2, (the arrow 35 denoting the direction in which the cam-carrier 11 revolves,) it will be seen that the fixed trip 29 is just about to be engaged by the face 25 of the toe 24, and when such engagement is effected the cam 20 is swung outward on its pivot 19 with a gradual movement, while at the same time its bodily movement of revolution continues. The compound movement of the cam thus produced moves its roll-engaging face 21 from the position shown in Fig. 2 to that shown in Fig. 3 by the time the point of the toe 24 has passed the point of the trip 29 and at the latter instant the high point 22 of the cam is leaving the roll 9. The described compound cam movement acts to give the roll a gradually-accelerated movement, as shown in Fig. 5, the acceleration increasing until about eighty per cent. of the movement of the pick-roll, and consequently the picker, has been effected, so that over three-fourths of the active stroke of the picker is performing useful work as compared with only half of such stroke. (See Fig. 4.) The pick-shaft 6 partakes of the movement of the roll, and consequently the picker-stick and picker will partake of the gradual and extended acceleration, starting and gradually increasing the speed of the shuttle through practically eighty per cent. of the active stroke of the picker. The impact of the picking cam and roll is not harsh, but, on the contrary, is relatively easy, reducing wear and minimizing shock and jar, while the starting and gradual speeding up of the movement of the roll to the maximum is effected readily and efficiently. Manifestly the greatest wear will come on the impact-face of the cam-toe 25 and upon the trip 29; but as the contacting surfaces of both parts are large the wear will not be rapid, and, furthermore, the wear can be taken up by adjustment of the trip-carrying bracket.

Referring to Fig. 4, it will be seen that the speed of movement of the roll is rapidly accelerated up to about the middle of its active stroke, so that the maximum speed of the picker is reached about mid-stroke, the speed gradually decreasing during the balance of the stroke, so that only about fifty per cent. of the stroke performs useful work.

In Fig. 5 the acceleration is more gradual and reaches its maximum when the active stroke is about eighty per cent. completed, showing a gain of thirty per cent. in useful work.

Adjustment of the cam-carrier 11 on the revolving shaft 2 affects the timing of the pick, as will be manifest, and this can also be modified by adjustment of the trip.

I have used the term "radial" herein, and in some of the claims to express the movement of the cam on its pivot 19 toward or from the center of the cam-carrier as opposed to the bodily movement of revolution of the cam about such center, inasmuch as the movement is generally radial so far as concerns the roll-engaging portion of the picking-cam.

My invention is not restricted to the precise construction and arrangement herein shown and described, as the same may be varied or modified in different particulars by those skilled in the art without departing from the spirit and scope of my invention.

Having fully described my invention, what I claim as new, and desire to secure by Letters Patent, is—

1. In picking mechanism for looms, a picking-shaft having an arm provided with a roll, a picking-cam to coöperate with the roll and rock said shaft, a revolving carrier on which said cam is pivotally mounted, and a trip to engage and rock the cam relatively to the carrier, to effect coöperation of the cam and roll, and move the latter with a gradual and extended acceleration.

2. In picking mechanism for looms, a picking-shaft having an arm provided with a roll, a picking-cam to coöperate with the roll and rock said shaft, a revolving carrier on which said cam is pivotally mounted, and a trip to engage the cam and gradually throw it outward at a predetermined point in the revolution of the carrier, to cause the cam to act upon the roll by the combined substantially radial and angular movements of the cam.

3. In picking mechanism for looms, a picking-shaft having an arm provided with a roll, a picking-cam to coöperate therewith, and means to subject the cam to combined angular and substantially radial movement at the time of engagement with the roll, to gradually accelerate the movement of the roll through the major portion of its active stroke.

4. In picking mechanism for looms, a picking-shaft having an arm provided with a roll, a revolving carrier, a picking-cam movable with and also relatively to said carrier and adapted to coöperate with the roll, and means to effect relative movement of the cam as the latter is brought into engagement with the roll.

5. In picking mechanism for looms, a picking-shaft having an arm provided with a roll, a revolving carrier, a picking-cam movable with and also relatively to said carrier and adapted to coöperate with the roll, a toe on the cam, a fixed trip to engage said toe and effect gradually-accelerated movement of the cam relative to the carrier when the cam engages the roll, and a spring to restore the cam to normal position thereafter.

6. In picking mechanism for looms, a picking-shaft having an arm provided with a roll, a revolving carrier, a picking-cam movable with and also relatively to said carrier and adapted to coöperate with the roll, and angularly-adjustable means to effect movement of the cam relatively to the carrier when the cam engages the roll, to gradually accelerate the movement of the roll and increase the extent of such accelerated movement.

7. In picking mechanism for looms, a picking-shaft having an arm provided with a roll, a revolving, disk-like cam-carrier, a picking-cam pivotally mounted thereon and having a roll-engaging portion projecting beyond its periphery, and a fixed tripping device to engage the picking-cam and throw outward its roll-engaging portion, to effect a gradual and extended increase in the speed with which the picking-cam moves the roll.

8. In picking mechanism for looms, a picking-shaft having an arm provided with a roll, a revolving, disk-like cam-carrier, a picking-cam pivotally mounted thereon and having a roll-engaging portion, a stop on the cam, a spring to act upon the cam and normally retain the stop in engagement with the periphery of the carrier, and a fixedly-mounted trip to periodically engage the cam between its center of revolution and the roll-engaging portion and move the latter outward to gradually increase the speed of movement of the roll when engaged by the cam.

9. In picking mechanism for looms, in combination, a picking-cam, separate means to effect bodily revolution of said cam, and intermittent outward movement thereof relative to its axis of revolution, and a picking-roll with which the cam coöperates when subjected to such combined movement.

10. In picking mechanism for looms, in combination, a revolving shaft, a carrier fixedly mounted thereon, a picking-cam pivotally mounted on the carrier and having a roll-engaging portion behind its pivot, a cam-retracting spring, a fixedly-mounted trip to periodically engage the cam back of its pivot and throw its roll-engaging portion outward, and a picking-shaft provided with a roll to be intermittingly acted upon by the picking-cam.

11. In picking mechanism for looms, in combination, a picking-shaft having an arm provided with a roll, a picking-cam having a roll-engaging portion, means to bodily revolve the cam about a fixed axis, a device to swing outward said cam from its axis of revolution as it coöperates with the roll, and means to angularly adjust the said device with relation to the axis about which the cam revolves bodily.

12. In picking mechanism for looms, in combination, a revolving carrier, a picking-cam thereon having a roll-engaging portion adapted to gradually engage the roll, a picking-shaft having an arm provided with said roll, and means to move the cam relatively to its carrier to thereby cause the roll-engaging portion to gradually increase the movement of the roll due to coöperation with the cam.

13. In picking mechanism for looms, means to effect the throw of the shuttle, including a picker-stick and an operatively-connected roll, and means to coöperate with the roll and gradually accelerate the movement thereof through the major portion of its active stroke, to thereby correspondingly act upon the shuttle through the picker-stick.

In testimony whereof I have signed my name to this specification in the presence of two subscribing witnesses.

HARRY A. DAVIS.

Witnesses:
CLARE H. DRAPER,
GEORGE OTIS DRAPER